United States Patent [19]
Tanaka

[11] 4,267,743
[45] May 19, 1981

[54] TRANSMISSION CONTROL DEVICE

[75] Inventor: Yoshiyuki Tanaka, Yokohama, Japan

[73] Assignee: Nissan Motor Company, Limited, Yokohama, Japan

[21] Appl. No.: 60,674

[22] Filed: Jul. 25, 1979

[30] Foreign Application Priority Data

Nov. 22, 1978 [JP] Japan .............................. 53-143264

[51] Int. Cl.³ .............................................. G05G 9/16
[52] U.S. Cl. ................................ 74/473 SW; 74/486; 74/493; 180/78
[58] Field of Search .............. 74/473 SW, 484 R, 485, 74/486, 492, 493; 180/78

[56] References Cited

U.S. PATENT DOCUMENTS

| 2,633,756 | 4/1953 | Dalby | 74/484 |
|---|---|---|---|
| 3,470,761 | 10/1969 | Okamoto et al. | 180/78 |
| 3,476,202 | 11/1969 | Dudley | 74/484 X |
| 4,132,123 | 1/1979 | Ishii et al. | 74/473 SW |
| 4,185,880 | 1/1980 | Shiomi et al. | 74/492 X |

FOREIGN PATENT DOCUMENTS 1081430  6/1954  France .................. 180/78

Primary Examiner—Allan D. Herrmann
Attorney, Agent, or Firm—Thompson, Birch, Gauthier & Samuels

[57] ABSTRACT

A column shift type transmission control device used in a tilt steering system. A tilt joint for coupling the upper control rod and the lower control rod of the transmission control device is provided in cabin side and the lower control rod is supported by the mount bracket so as to make an opening in the mount bracket smaller to contribute for noise separation and for easy assembling.

5 Claims, 5 Drawing Figures

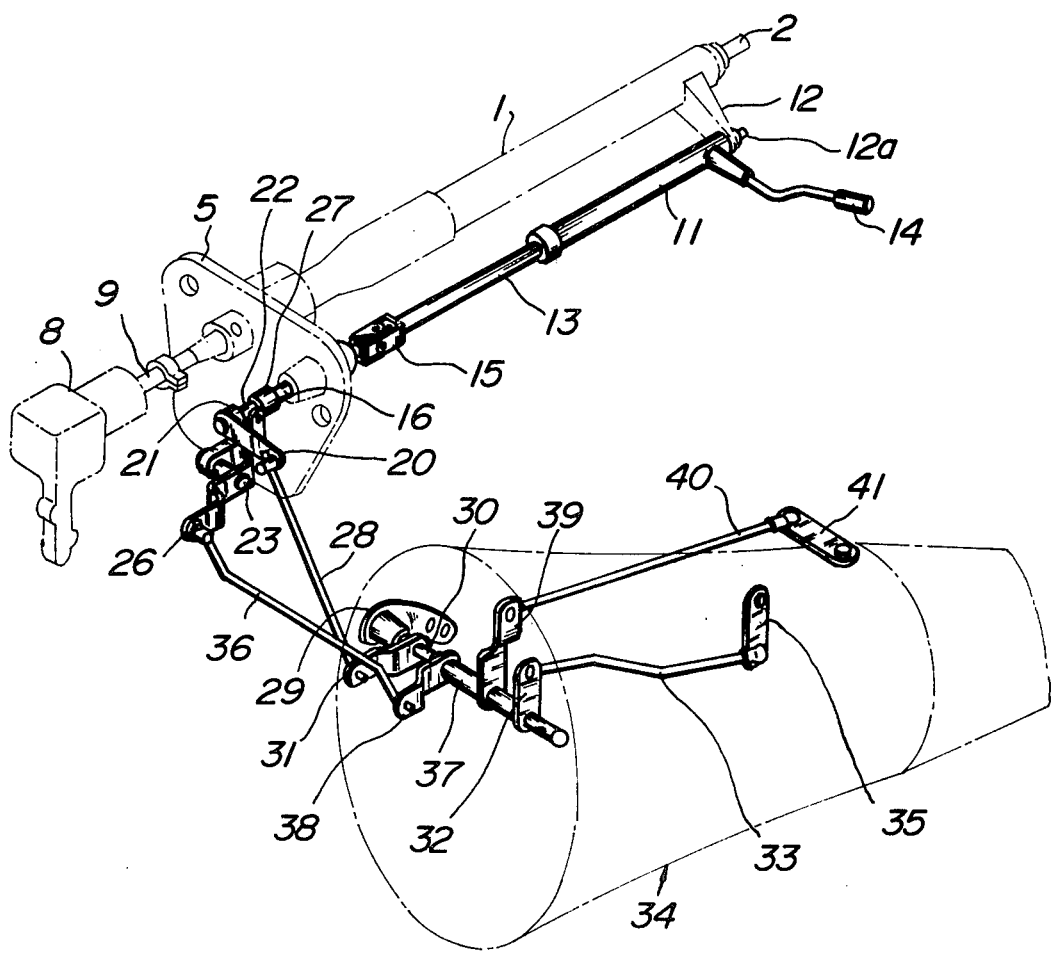

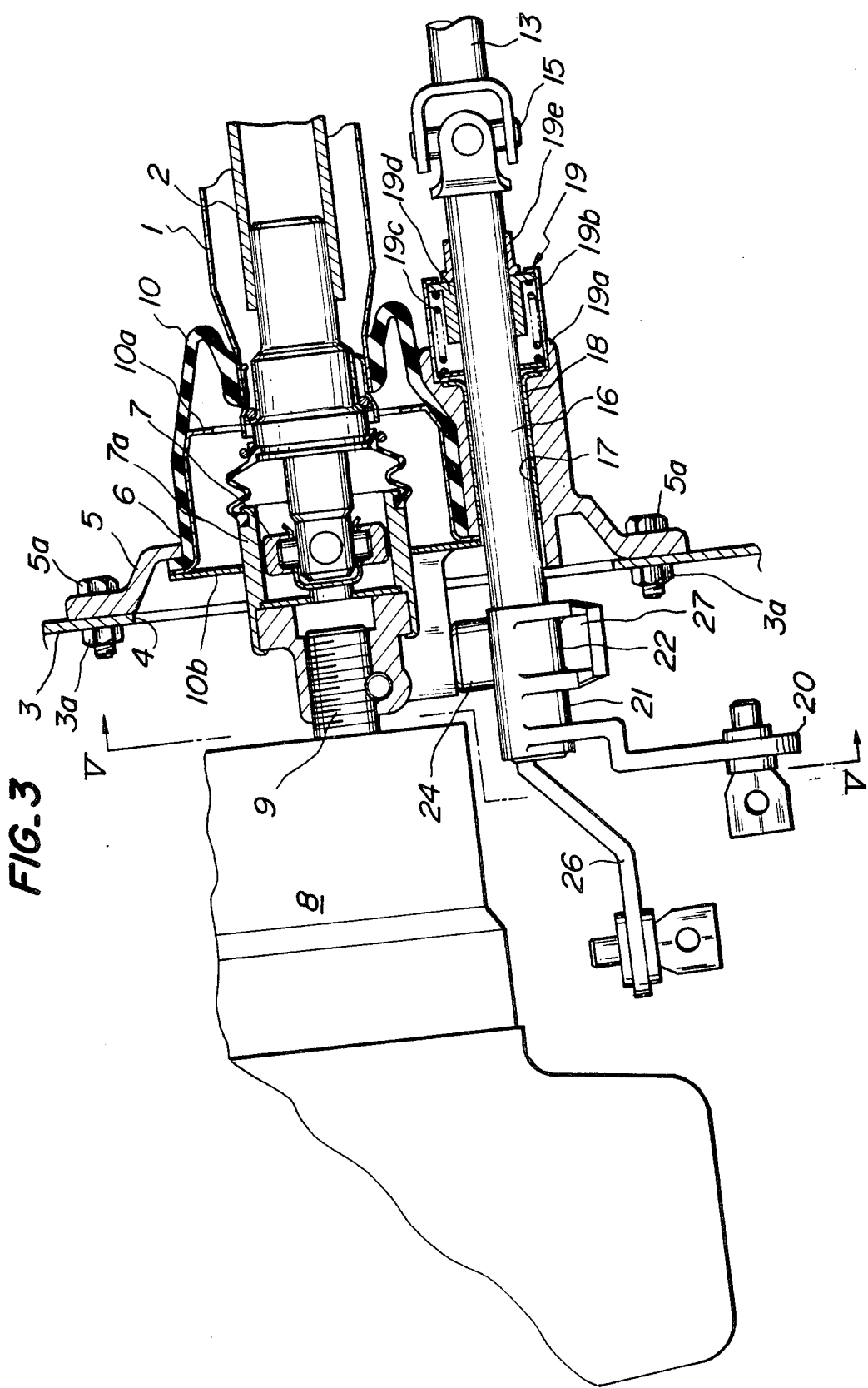

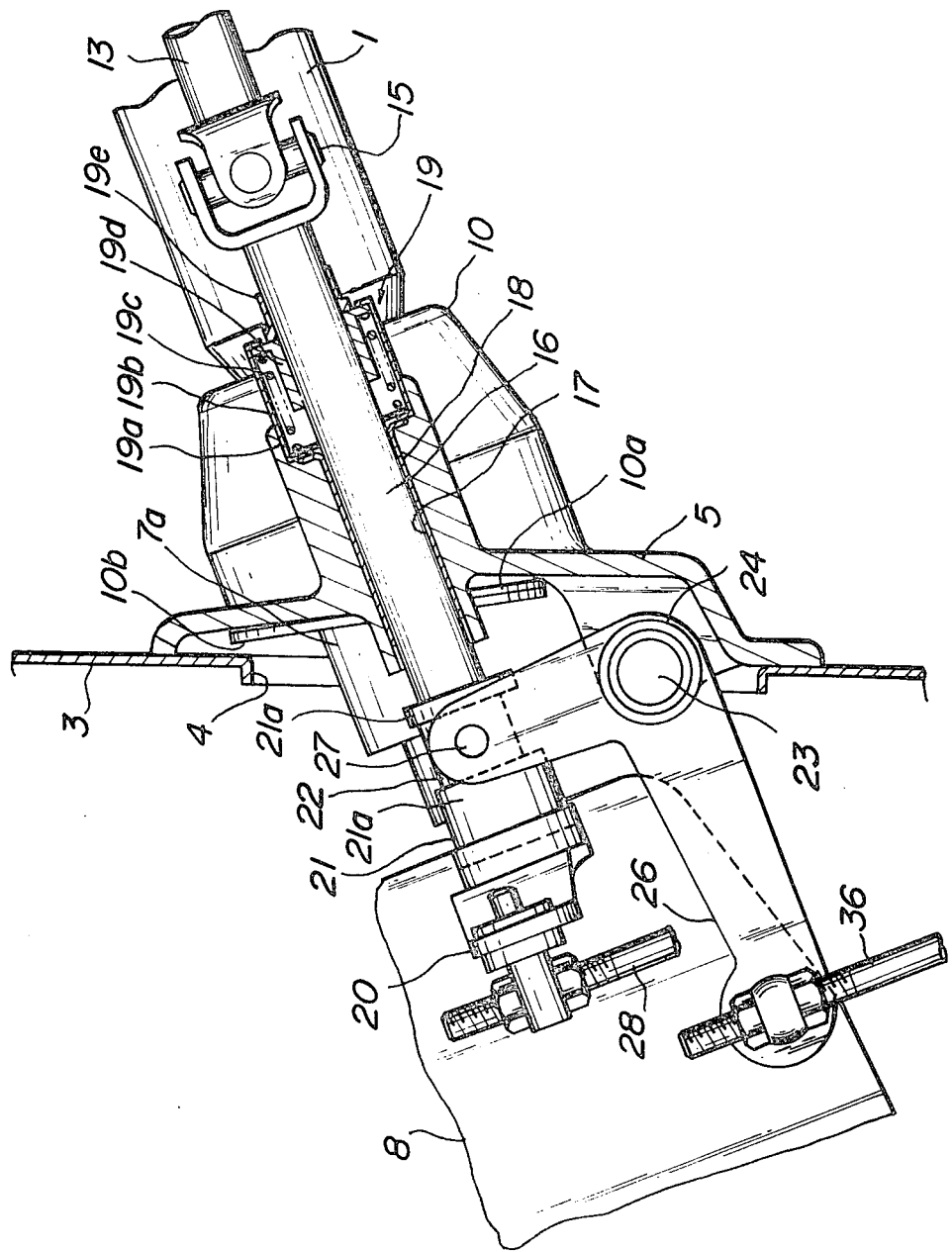

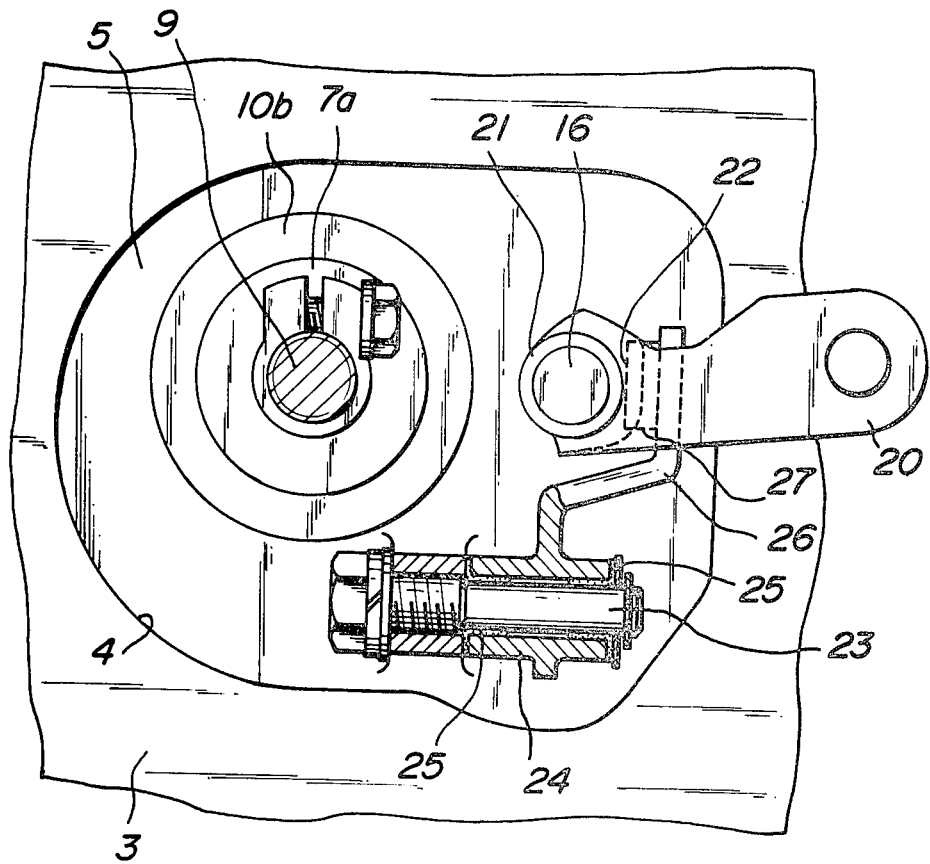

TRANSMISSION CONTROL DEVICE

BACKGROUND OF THE INVENTION

1. Field of the Invention

The present invention relates to a column shift type transmission control device to be used in a tilt steering system.

2. Description of the Prior Art

In a conventional tilt steering system, a tilt joint for coupling the upper control rod and the lower control rod of the column shift type transmission control device is arranged at the engine room side with respect to the dash panel.

In such a conventional construction, the shape of the opening hole in the mount bracket for passing the rod becomes larger in order to cover swing movement of the upper control rod. This was a disadvantage in view of noise separation and the noise generated in the engine room tends to intrude into the cabin quite easily. Furthermore, since the lower control rod is not supported by the mount bracket, a support bracket for supporting the lower control rod in the engine room side should be provided, for instance, on a gear box of the steering device and a dust boot for sealing the clearance between the upper control rod and the opening hole of the mount bracket should be provided. This causes complication in mounting and inconvenience for the noise separation.

SUMMARY OF THE INVENTION

The present invention is to improve the inconveniences of the aforementioned disadvantages of the conventional transmission control device. In the present invention, the upper control rod and the lower control rod are coupled by a tilt joint in the cabin side with respect to the dash panel and the lower control rod is supported by the mount bracket itself.

BRIEF DESCRIPTION OF THE DRAWINGS

FIG. 2 is a perspective view for showing one embodiment of the device according to the present invention;

FIG. 3 is a plan view partly in cross-section for showing the main portion thereof;

FIG. 4 is a side view partly in cross-section for showing the main portion of the same; and FIG. 5 is a view taken along arrows V—V in FIG. 3.

DETAILED EXPLANATION OF THE PREFERRED EMBODIMENTS

Figure 1:
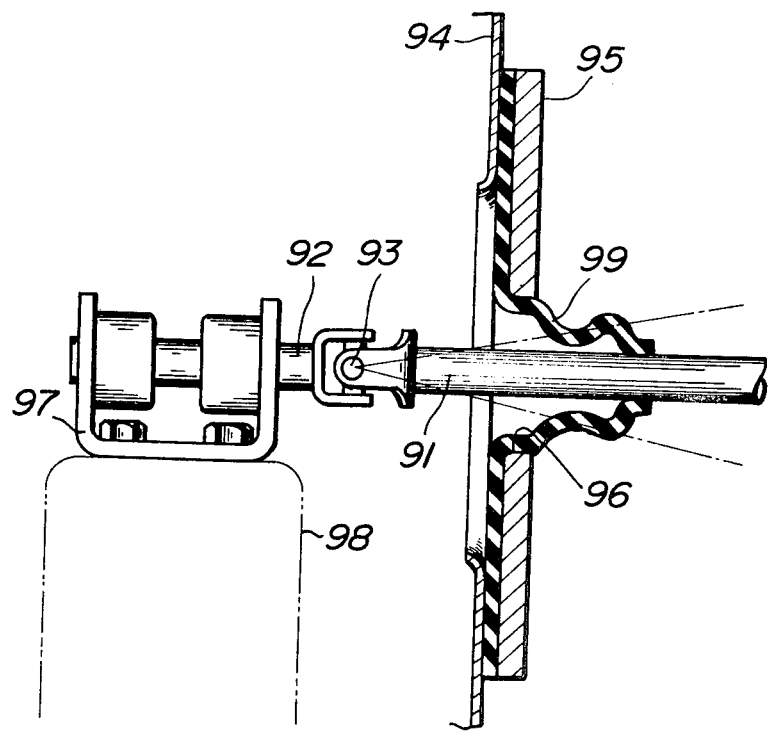
FIG. 1 is a cross-sectional side view for showing a conventional tilt steering system.

In order to give a clear understanding of the present invention at first the conventional column shift type transmission control device for a tilt steering will be explained by referring to FIG. 1. As shown in FIG. 1, the tilt joint 93 provided for connecting the upper control rod 91 and the lower control rod 92 is arranged at the engine room side with respect to the dash panel 94.

In such a conventional construction, the shape of the opening hole 96 of the mount bracket for passing the upper rod 91 should be made considerably larger in order to allow swinging movement of the upper control rod 91 when the steering column is tilted up down direction. If this opening hole is made larger, the noise generated in the engine room may easily be introduced into the cabin so that a disadvantage in noise separation exists. Furthermore, since the lower control rod 92 is not supported by the mount bracket 95, it has been required to provide a separate support bracket 97 for supporting the lower control rod 92, for instance, on a gear box 98 of the steering device and also to provide a dust boot 99 for sealing the clearance between the opening hole 96 and the upper control rod 91.

The invention is to improve aforementioned inconveniences.

A preferred embodiment of the present invention will now be described by referring to FIGS. 2 to 5.

In these drawings, the reference numeral 1 designates a steering column, 2 a steering shaft inserted in said steering column and coupled with a steering wheel (not shown) at the upper end thereof and being rotated by the handling action of the driver. This steering shaft 2 is arranged just to pass an opening hole 6 of a mount bracket 5, which is shaped to meet an opening hole 4 of the dash panel 3 and is secured therewith by means of bolts 5a and nuts 3a. The steering shaft 2 is coupled to an input shaft 9 of a steering gear box 8 provided at the engine room side by means of a tilt joint 7 located in said opening hole 6 to form a tilt steering mechanism. Reference numeral 10 designates a comparatively thick dust boot mounted on the mount bracket 5 by means of a reinforcement metal structure 10a at the lower side. The upper side of the dust boot 10 is arranged to press against the lower portion of the steering column 1. The dust boot 10 separates and shields the cabin from the engine room. Reference numeral 10b is a buffle plate provided below the reinforcement metal structure 10a.

A tube 11 for the control rod is supported on a shaft 12a in a manner rotatably and slidably therewith. The shaft 12a is in turn mounted on a support bracket 11 attached on the steering column 1. A control rod designated by numeral 13 is fixed at the lower end of the tube 11. The tube 11 and the control rod 13 joined together form the upper control rod. The upper control rod 11, 13 moves axially and rotates about the axis according to the selecting and shifting operation of the change lever 14.

The control rod 13 of the upper control rod is joined to the lower control rod 16 by means of a tilt joint 15 in the cabin side with respect to the dash panel 3. The lower control rod 16 is inserted in a separate opening hole 17 provided in the mount bracket 5 through a bush 18 in a manner freely rotatable and slidable. The reference numeral 19 indicates a reverse check mechanism. This mechanism 19 comprises a tube 19b pressed into a hole 19a coaxially with the opening hole 17 of the mount bracket 5 and having larger inner diameter than the hole 17, a spring 19c compressed between the end walls of said tube 19b, a sliding member 19d pressed against an end wall of the tube 19b by said spring 19c, and a pressing member 19e to press the sliding member 19d into the tube 19b against the spring 19c when the change lever 14 coupled to the lower control rod 16 is moved to the reverse position. This reverse check mechanism 19 gives a resistive load for changing the lever at the changing motion into reverse position.

At the end of the lower control rod 16 in the engine room, a boss 21 of a shift lever 20 is fixed. The boss 21 comprises two projections 21a and 21a to form a reentrant groove 22 therebetween. In the groove 22, an end of a selector lever 26 being formed as a slider pin 27 is engaged. The selector lever 26 has generally L shaped as shown in FIG. 5 and comprises a boss 24. The boss 24 is engaged with a fixing pin 23 secured to the mount bracket 5 by means of bushes 25 and 25.

The shift lever 20 is connected to an end of a rod 28. The other end of the rod 28 is connected to a lever 31 formed integrally with a cross shaft 30 pivoted on a cross shaft bracket 29. A separate lever 32 formed integrally with said cross shaft 30 is coupled with a shift lever 35 at the side of transmission 34 via a rod 33. The other end of the selector lever 26 is connected to a rod 36 and coupled thereby with a lever 38 fixed on a sleeve 37 mounted on said cross shaft 30. A separate lever 39 fixed on said sleeve 37 is coupled with a selector lever 41 at the side of the transmission 34 via a rod 40.

When the change lever 14 is moved axially in the selecting operation, the upper control rod 13 is moved in the axial direction and the lower control rod 16 is likewisely moved in the same direction by the coupling of the joint 15 and guided by the bush 17. If the selecting operation is to the reverse side, the shifting load increases as mentioned in the foregoing by the reverse check mechanism so as to clearly indicate the position and to prevent the selective movement to the reverse side by malfunction. When the lower control rod 16 is moved in the axial direction, the recess or groove 22 in the boss 21 shifts likewisely to move the slider pin 27 and to rotate the selector lever 26. The sleeve 37 is rotated by the rod 36 and the lever 38. By this rotation of the sleeve 37, the selector lever 41 at the transmission side is driven to rotate by the lever 39 and the rod 40 and thus the selecting operation in the transmission 34 is effected.

Further if the change lever 14 is rotated in the shift operation, the upper control rod 11, 13 rotates and the lower control rod 16 coupled therewith by the joint 15 likewisely rotates in the bush 17. By this rotational movement, the shift lever 20 rotates and the cross shaft 30 is rotated via the rod 28 and the lever 31. Further the shift lever 35 in the transmission side is rotated by the lever 32 and the rod 33 to effect shift operation in the transmission 34.

When the steering column 1 is tilted, the steering shaft 2 and the steering column 1 swing about the joint 7. According to this movement the upper control rod 11, 13 swing about the joint 15. In this case the lower control rod 16 slightly shifts in the axial direction due to minor difference in position of the joints 7 and 15.

In the construction of the present invention, the lower control rod 16 is supported by the mount bracket 5. Accordingly, there is no need to provide a large opening hole allowing swing movement of the lower control rod 16 in the mount bracket 5. Such clearance is required only at the hole 6 for accommodating the steering shaft 2. By this the noise leaking into the cabin from the engine room can be decreased substantially. Further, since the tilting joint 7 for the steering shaft 2 is arranged to locate in the cabin side viewed from the dash panel 3, a comparatively small clearance of the opening through hole 6 is required and the swing movement of the column mounting portion of the boot 10 when the steering column is tilted can be made comparatively small. By this reason, a comparatively thick material for the boot 10 may be used, which also contributes in the improvement of the noise separation or noise insulation.

Further by a reason that the boot 10 is restricted in a considerable extent from its swinging movement by having the reinforcement metal structure 10a and that a buffle plate 10b, of which inner edge being made in contact with a case 7a which is fixed and does not swing by the motion of the tilt joint 7, is provided at the bottom of flange portion of said reinforcement structure 10a, the effective size of the opening provided at the dash panel 3 can be made very small. Thus the dust boot 10 provides a duplicate noise insulation effect. It is obvious that there is no need to provide a separate dust boot for the control rod nor to provide a separate support bracket for the lower control shaft.

At assembling, the lower control rod 16 attached with the shift lever 20 and the selector lever 26 may previously be mounted on the mount bracket 5. Accordingly, after assembling the mount bracket 5 with the steering column 1, the assembled unit can easily be carried or transported. By coupling the tilt joint 7 with the input shaft 9 of the steering gear box 8, the mount bracket can easily be mounted on the dash panel 3 so that the assembling operation of this unit can be made easily.

As has been explained in the foregoing, the opening of the mount bracket to be fixed on the dash panel and for passing through the control rod can be made smaller, which is quite beneficial for noise separation. Furthermore, the opening for passing through the steering shaft can conveniently be made very compact, which is effective both for noise separation and as an additional advantage for easy assembling.

What is claimed is:

1. A transmission control device comprising in combination,
    an upper control rod driven to shift and to rotate by a change lever, and being supported at the upper end of said upper control rod by a support bracket mounted by a steering column housing a steering shaft,
    a lower control rod supported slidably and freely rotatably by a mount bracket secured on a dash panel and having an end projecting in an engine room side and coupled to a transmission device via a linkage, and
    a tilt joint for coupling the lower end of the upper control rod and the cabin side end of the lower control rod.

2. A transmission control device as claimed in claim 1, wherein the mount bracket comprises a fixed pin in the engine room side, and a selector lever coupled against the lower control rod is pivoted on said fixed pin.

3. A transmission control device as claimed in claim 1, wherein the lower control rod is provided with a reverse check mechanism for suppressing axial movement of the rod in one direction and the reverse check mechanism is formed integrally with said mount bracket.

4. A transmission control device as claimed in claim 1, wherein the mount bracket comprises an opening through hole for passing the steering shaft, and the device further comprises a dust boot of which one end is secured at the opening through hole and another end of the dust boot is engaged with the lower portion of the steering column, and the dust boot is arranged to have a reinforcement metal structure at inside thereof.

5. A transmission control device as claimed in claim 4, wherein the steering shaft comprises a tilt joint in said dust boot, and the engine room side of the tilt joint is formed as a casing and the steering column side of the tilt joint is formed to couple internally with said casing, and the reinforcement metal structure of the dust boot is provided with a buffle plate having an inner edge coupling with an outer edge of said casing of the tilt joint.

* * * * *